(12) United States Patent
Aher et al.

(10) Patent No.: US 11,227,593 B2
(45) Date of Patent: Jan. 18, 2022

(54) SYSTEMS AND METHODS FOR DISAMBIGUATING A VOICE SEARCH QUERY BASED ON GESTURES

(71) Applicant: Rovi Guides, Inc., San Jose, CA (US)

(72) Inventors: Ankur Aher, Maharashtra (IN); Nishchit Mahajan, Punjab (IN); Narendra Purushothama, Karnataka (IN); Sai Durga Venkat Reddy Pulikunta, Andhra Pradesh (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/456,275

(22) Filed: Jun. 28, 2019

(65) Prior Publication Data

US 2020/0410995 A1    Dec. 31, 2020

(51) Int. Cl.
| | | |
|---|---|---|
| G10L 15/22 | (2006.01) | |
| G06F 16/2457 | (2019.01) | |
| G06F 16/248 | (2019.01) | |
| G10L 15/26 | (2006.01) | |
| G06F 3/01 | (2006.01) | |
| G06K 9/00 | (2006.01) | |
| G06F 16/242 | (2019.01) | |

(52) U.S. Cl.
CPC ............ G10L 15/22 (2013.01); G06F 3/017 (2013.01); G06F 16/243 (2019.01); G06F 16/248 (2019.01); G06F 16/24575 (2019.01); G06K 9/00335 (2013.01); G10L 15/26 (2013.01); *G06K 2209/27* (2013.01)

(58) Field of Classification Search
CPC ..... G10L 15/22; G10L 15/265; G06F 16/243; G06F 16/24575; G06F 16/248; G06F 3/017; G06K 9/00335; G06K 2209/27
USPC ....................................................... 704/235
See application file for complete search history.

(56) References Cited

U.S. PATENT DOCUMENTS

| | | | | |
|---|---|---|---|---|
| 6,111,580 A | * | 8/2000 | Kazama | ................... G06F 3/017 340/575 |
| 8,818,716 B1 | * | 8/2014 | El Dokor | ........... G01C 21/3682 701/426 |
| 2012/0323521 A1 | * | 12/2012 | De Foras | .............. G06F 3/0346 702/141 |
| 2014/0081633 A1 | * | 3/2014 | Badaskar | ................ G06F 3/167 704/235 |

(Continued)

*Primary Examiner* — Pierre Louis Desir
*Assistant Examiner* — Nicole A K Schmieder
(74) *Attorney, Agent, or Firm* — Haley Guiliano LLP

(57) ABSTRACT

Systems and methods are described herein for disambiguating a voice search query by determining whether the user made a gesture while speaking a quotation from a content item and whether the user mimicked or approximated a gesture made by a character in the content item when the character spoke the words quoted by the user. If so, a search result comprising an identifier of the content item is generated. A search result representing the content item from which the quotation comes may be ranked highest among other search results returned and therefore presented first in a list of search results. If the user did not mimic or approximate a gesture made by a character in the content item when the quotation is spoken in the content item, then a search result may not be generated for the content item or may be ranked lowest among other search results.

16 Claims, 8 Drawing Sheets

(56) References Cited

U.S. PATENT DOCUMENTS

| | | | |
|---|---|---|---|
| 2016/0162082 A1* | 6/2016 | Schwesinger | G06F 3/167 |
| | | | 345/173 |
| 2018/0096221 A1* | 4/2018 | Stathacopoulos | G06F 16/5866 |
| 2018/0160200 A1* | 6/2018 | Goel | G06F 40/289 |
| 2019/0166403 A1* | 5/2019 | Yelton | H04N 21/4394 |
| 2019/0325224 A1* | 10/2019 | Lee | G10L 15/22 |
| 2020/0074014 A1* | 3/2020 | Bakir | G06K 9/6267 |
| 2020/0356592 A1* | 11/2020 | Yada | G06F 40/20 |

* cited by examiner

800

802 — Receive image data representing at least a portion of the body of the user 804 — Identify portions of the body of the user represented in the image data 806 — Determine a position of each identified portion of the body of the user 808 — Determine a respective relative position of each identified portion of the body of the user relative to each other identified portion of the body of the user

902 — Receive position data from at least one user device placed on the body of the user 904 — Identify a portion of the body of the user on which the at least one user device is located 906 — Determine a position of the identified portion of the body of the user relative to other portions of the body of the user

FIG. 9

SYSTEMS AND METHODS FOR DISAMBIGUATING A VOICE SEARCH QUERY BASED ON GESTURES

BACKGROUND

The present disclosure relates to providing search results and, more particularly, disambiguation of a voice search query based on gestures made by a user when entering the voice search query.

SUMMARY

Voice search applications on content platforms allow users to search for content using voice commands. Using command keywords in conjunction with search parameters, users can instruct the application to perform a search query for particular content items. Users can also use a famous quote from a particular content item as a search query for that content item. When quotes also match the titles of content items, however, the application may not recognize that the user is attempting to search for the particular content item from which the quote comes, and instead performs a search for content titles using the words of the quote.

Systems and methods are described herein for disambiguating a voice search query by determining whether the user made a gesture while speaking a quotation from a content item and whether the user mimicked or approximated a gesture made by a character in the content item when the character spoke the words quoted by the user. If so, a search result comprising an identifier of the content item is generated. The voice search query may also be processed as a standard search query based on the words of the quotation, which returns a number of search results. The search result representing the content item from which the quotation comes may be ranked highest among the search results returned and therefore presented first in a list of search results. If the user did not mimic or approximate a gesture made by a character in the content item when the character is speaking or uttering the quotation, then a search result may not be generated for the content item or may be ranked lowest among other search results.

Upon receiving the voice search query, the system, in some embodiments described below, transcribes the voice search query into a string of text. An image or other data representing a pose made by the user at the time of entering the search query is also captured, including at least some portion of the body of the user. A query is made to a database of quotations using the string. In response to the query, metadata of a quotation matching the string is received. The metadata includes pose information describing how the speaker of the quotation is posed in the content item when uttering the quotation and an identifier of the content item from which the quotation comes. The captured pose is compared with the pose information in the metadata of the quotation and the system determines whether the captured pose matches the pose information in the quotation metadata. If a match is detected, then a search result comprising an identifier of the content item from which the quotation comes is generated. To determine whether there is a match, the system compares the distance between portions of the body of the user captured in the pose with the distance between corresponding portions of the body of the speaker of the quotation in the pose information. The system may establish a threshold of similarity by adding a certain amount to each distance, or by increasing each distance by a certain percentage. The system determines that the captured pose matches the pose information if the distance between each position of the body of the user captured in the pose falls within the threshold of similarity.

In addition to receiving metadata of the quotation, the system may also receive a plurality of content identifiers of content items having metadata matching the string. Each of the content identifiers may be ranked based on the degree to which the metadata of the content identifier matches the string. If the captured pose of the user matches the pose information in the metadata of the quotation, however, the content identifier corresponding to the quotation will be ranked higher than each of the other content identifiers. The system orders the content identifiers by rank and displays them in that order. Thus, if the captured pose of the user matches the pose information, the content identifier corresponding to the quotation is displayed first, followed by each of the content identifiers in the plurality of content identifiers.

The pose of the user may be captured as an image and processed to identify certain portions of the body of the user (e.g., hands, head, etc.). The system may calculate a distance between each portion and generate metadata describing the pose. The metadata may include position data for each identified portion of the body of the user, and information about the distance between each portion.

In some cases, the pose may have an associated motion. The system may capture a number of successive poses of the user corresponding to the period of time during which the voice search query originated. The system may capture several still frames or a video clip, or may track individual portions of the body of the user to capture the motion associated with the pose. The system identifies a travel path for each portion of the body of the user. The pose information may also contain information describing the path of each portion of the body of the character making the pose to which the system compares the travel paths to determine if the captured pose matches the pose information.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 is a flowchart representing a process for capturing the pose of a user, in accordance with some embodiments of the disclosure;

FIG. 9 is a flowchart representing a second process for capturing the pose of a user, in accordance with some embodiments of the disclosure.

DETAILED DESCRIPTION

Voice-based search applications are optimized for natural language input. Certain words or phrases are designated as command keywords which inform the application of what function the user wants to activate. If no command keywords are spoken, the applicant defaults to performing a search for any content having metadata matching the words of the voice search. However, the user may say a quotation from a content item as a search for that content item. For example, the user may say "I'm the king of the world!" as a search for the movie "Titanic." In order to determine that the user intends to search for a content item from which the quotation comes, the application captures not only the voice search, but also images or other data representing a pose or gesture made by the user while saying the quotation. For example, the user may hold his or her arms wide while saying "I'm the king of the world!" in an effort to mimic the way actor Leonardo DiCaprio holds his arms while saying the quotation in the movie "Titanic." The application compares the pose or gesture made by the user with pose information of content items with known quotations matching the words of the voice search. If the pose or gesture made by the user is the same as or similar to the pose information of a quotation, the application generates a search result for the content item from which the quotation comes. In some embodiments, the application may assign a rank to the content item from which the quotation comes and perform a regular content search based on the voice input as well, assigning ranks to each content item. The application then generates search results for the content items having the highest ranks. The application may rank the content item from which the quotation comes highest among all the content items such that the content item from which the quotation comes is displayed first. If the pose or gesture made by the user is different from the pose information, the application may assign a lowest rank to the content item from which the quotation comes.

Figure 1:
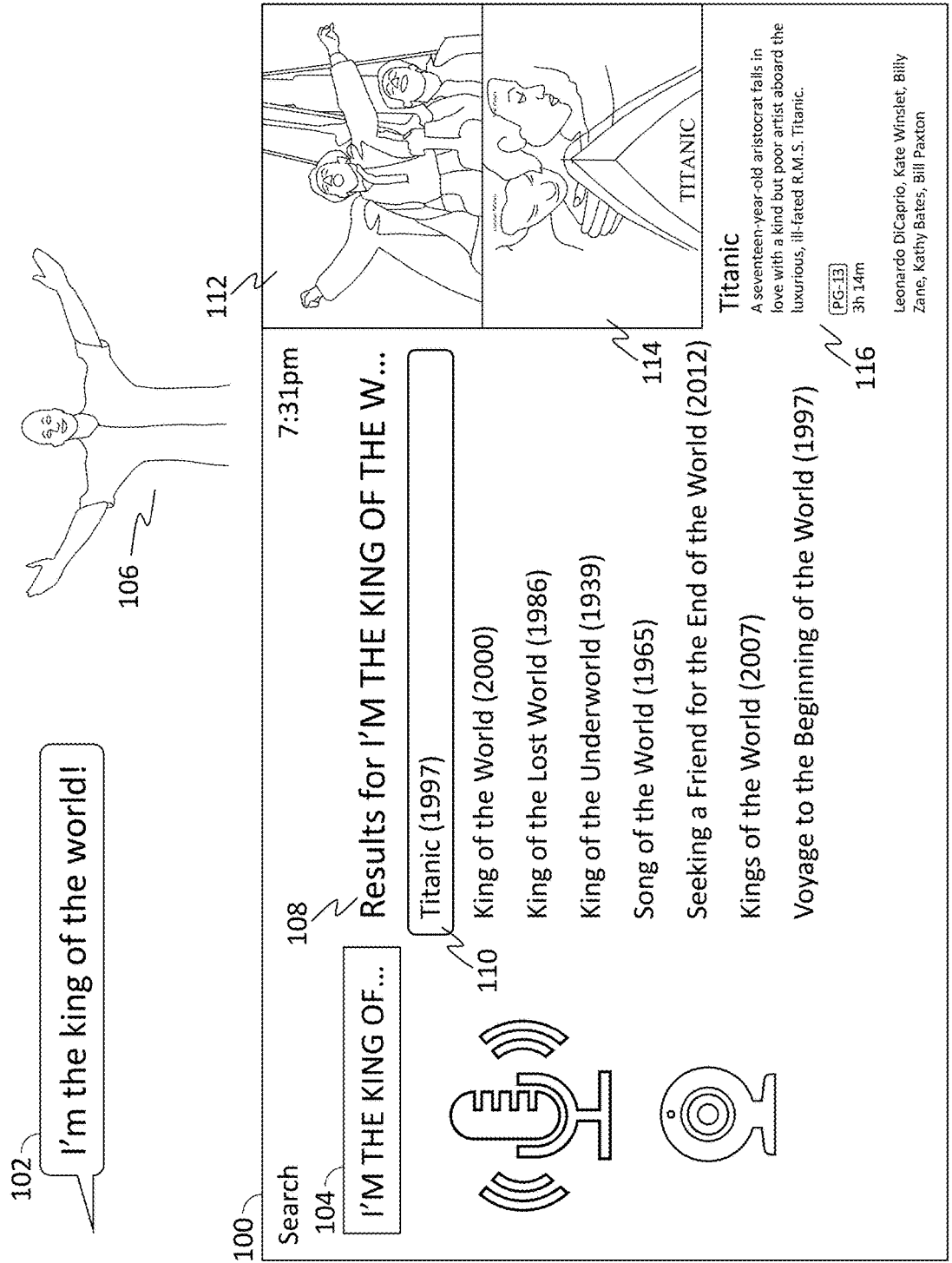
FIG. 1 shows an exemplary search interface, in accordance with some embodiments of the disclosure.

FIG. 1 shows an exemplary search interface 100, according to some embodiments of the disclosure. The search application receives the voice search query 102 comprising the words "I'm the king of the world!" The application transcribes the voice search query 102 into a string of text 104 (displayed in a truncated fashion in FIG. 1). The search application also receives pose 106 of the user. The search application queries a database for content items matching text 104, and content items with known quotations matching or similar to text 104. The application receives, in response to the query, metadata of at least one quotation. Included in the metadata of each quotation is pose information for the quotation. The application compares pose 106 with the pose information in the metadata of each quotation. The application determines the position of at least one portion of the body of the user and compares it with the corresponding position data in the pose information. An upper and a lower threshold level of similarity may be established by increasing or decreasing the distance between various positions in the pose information, for example, increasing the distance between the head and left hand of a character associated with the quotation by ten percent. The application then determines whether the distance between each portion of the body of the user captured in the pose is between the upper and lower threshold of the distance between corresponding portions of the body of the character in the pose information. If so, the application determines that the pose matches the pose information and generates, as the first result of a plurality of search results 108, a search result 110 comprising an identifier of the content item from which the quotation comes. For example, if the captured pose of the user indicates that the user spread his or her arms apart when saying "I'm the king of the world!" in a way that is similar to how actor Leonardo DiCaprio spreads his arms when saying the phrase in the movie "Titanic," the application generates a search result 110 for the movie "Titanic." The application also generates for display a still image 112 from the movie of a scene in which the quotation is said, as well as a thumbnail image 114 representing the movie and summary information 116 describing the movie. Search results may be ordered based on rank, where higher ranks are associated with closer matches to the search string. In some embodiments, search result 110 may be ranked highest among all search results. If the captured pose of the user indicates that the user did not spread his or her arms when saying the quotation in a way that is similar to how the actor spread his arms when saying the phrase, a search result for "Titanic" may not be generated, or may be ranked lowest among all search results.

Figure 2:
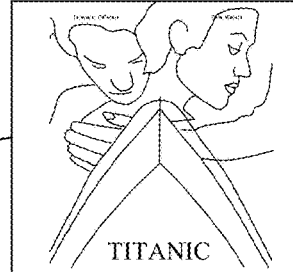
FIG. 2 shows another exemplary search interface, in accordance with some embodiments of the disclosure.

FIG. 2 shows another exemplary search interface presented on a mobile device 200, in accordance with some embodiments of the disclosure. Mobile device 200 receives voice search query 102 and displays the transcribed text of the voice search query in search box 202. Mobile device 200 also captures pose 104 using camera 204. A thumbnail image 206 of the movie "Titanic" is displayed as the first search result in response to voice search query 102.

Figures 3, 4:
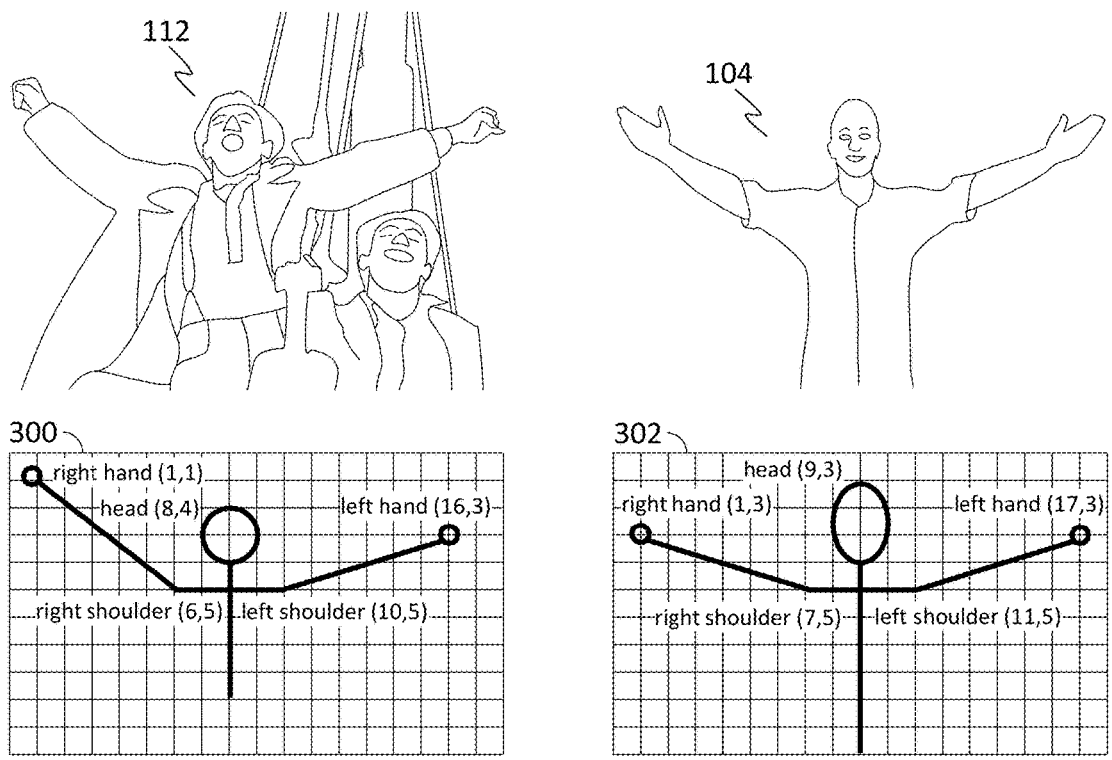
FIG. 3 shows exemplary pose information, in accordance with some embodiments of the disclosure.
FIG. 4 shows exemplary metadata describing pose information, in accordance with some embodiments of the disclosure.

FIG. 3 shows exemplary pose information, in accordance with some embodiments of the disclosure. Pose information 300 corresponds to pose 112 made by Leonardo DiCaprio in the movie "Titanic" when saying "I'm the king of the world!" Using image processing methods such as object recognition, facial recognition, edge detection, or any other suitable image processing method, portions of Leonardo DiCaprio's body are identified and the position of each identified portion is determined. In the example of FIG. 3, a Cartesian coordinate plane is used to identify the position of each identified portion of Leonardo DiCaprio's body, with the position recorded as (X,Y) coordinates on the plane. For example, Leonardo DiCaprio's right hand, right shoulder, head, left shoulder, and left hand are at coordinates (1,1), (6,5), (8,4), (10,5), and (16,3), respectively. Similarly, pose information 302 corresponds to the pose or gesture 104 made by the user when entering the voice search query. The user's right hand, right shoulder, head, left shoulder, and left hand are determined to be at coordinates (1,3), (7,5), (9,3), (11,5), and (17,3), respectively.

FIG. 4 shows exemplary metadata describing pose information for a quotation and metadata describing a user pose, in accordance with some embodiments of the disclosure. Metadata 400 is associated with the quotation "I'm the king of the world!" and contains pose information 402 describing the pose made by the character or actor when speaking the quotation. Pose information 402 contains position data 402a, 402b, 402c, 402d, and 402e representing the coordinates of portions of the actor's body as described above. Pose information 402 also includes distance information 404. Distance information 404 contains distances 404a, 404b, 404c, and 404d between the portions of the actor's body, calculated as the square root of the sum of the square of the difference between the X coordinate of two positions and the square of the difference between the Y coordinate of the two positions. Similarly, metadata 406 represents the user pose information and contains position data 408, 410, 412, 414, and 416 representing the coordinates of portions of the body of the user, as well as distance information 418. Similar to distance information 404, distance information 418 contains distances 418*a*, 418*b*, 418*c*, and 418*d* between the portions of the body of the user, calculated using the same formula described above.

Figure 5:
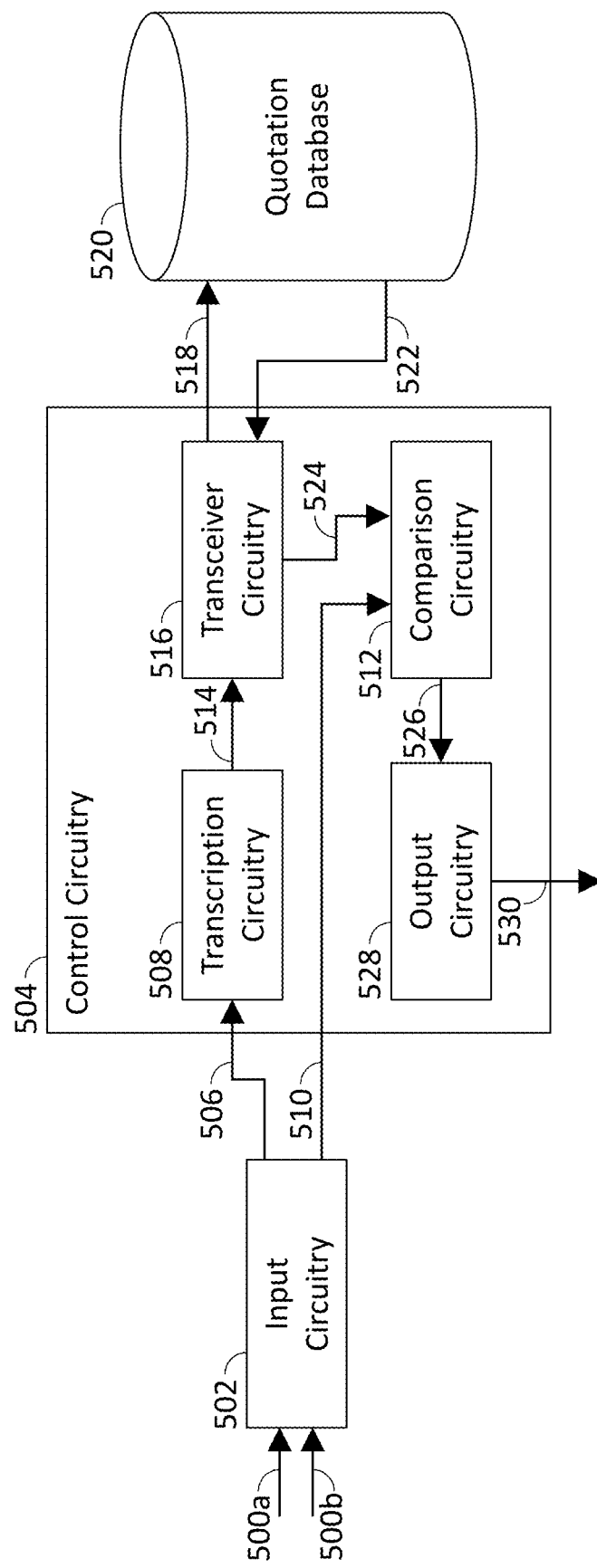
FIG. 5 is a block diagram representing control circuitry, components, and data flow therebetween for disambiguating a voice search query based on a gesture of the user, in accordance with some embodiments of the disclosure.

FIG. 5 is a block diagram representing control circuitry, components, and data flow therebetween for disambiguating a voice search query, in accordance with some embodiments of the disclosure. Voice input 500*a* (e.g., voice search query 102) and user pose 500*b* are received using input circuitry 502. Input circuitry 502 may be a data interface such as a Bluetooth module, WiFi module, or other suitable data interface through which data captured by another device can be received. Alternatively, input circuitry 502 may include a microphone through which audio information is captured directly or a camera or other imaging sensor through which video and/or image data is captured directly. For example, input circuitry 502 may include one or more cameras used to optically capture the pose of the user and triangulate the positions of various portions of the body of the user in three dimensions. Input circuitry 502 may alternatively use one or more cameras to detect the location of passive markers, such as reflective or retroreflective dots placed on the body of the user, and track the location of each portion of the body of the user, or active markers such as LED lights placed on the body of the user and individually pulsed. Input circuitry 502 may use a camera and, alternatively or additionally, an infrared sensor to capture the pose of the user and perform image processing methods described above on the positioning of portions of the body of the user based on the visual information or infrared signature corresponding to each portion of the body of the user. As another alternative, input circuitry 502 may receive inertial data from at least one inertial measurement unit held or worn by the user. The inertial data may be used to track the position of the portion of the body in which the inertial measurement unit is held or on which it is worn. Input circuitry 502 may convert the audio to a digital format such as WAV. Input circuitry 502 communicates voice input 500*a* to control circuitry 504. Control circuitry 504 may be based on one or more microprocessors, microcontrollers, digital signal processors, programmable logic devices, field-programmable gate arrays (FPGAs), application specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Input circuitry 502 communicates 506 voice input 500*a* to transcription circuitry 508 of control circuitry 504. Transcription circuitry 508 comprises speech-to-text circuitry and/or programming which transcribes voice input 500*a* into a string of text (e.g., text 104). Input circuitry 502 also communicates 510 the pose or gesture 500*b* to comparison circuitry 512 of control circuitry 504. Comparison circuitry 512 compares the pose or gesture 500*b* with pose information in metadata of at least one quotation.

Transcription circuitry 508 transfers string 514 to transceiver circuitry 516. Transceiver circuitry 516 may be a network connection such as an Ethernet port, WiFi module, or any other data connection suitable for communicating with a remote server. Transceiver circuitry 516 transmits a query 518 to quotation database 520 for quotations that match string 514. The query may be an SQL "SELECT" command, or any other suitable query format. Transceiver circuitry 516 receives, in response to query 518, quotation metadata 522 from quotation database 520. Transceiver circuitry 516 communicates 524 the quotation metadata to comparison circuitry 512. Comparison circuitry 512 compares the pose or gesture 500*b* made by the user with pose information in quotation metadata 522. Control circuitry 504 may establish upper and lower thresholds of similarity for the pose as described above. Comparison circuitry 512 may determine whether the pose or gesture 500*b* falls between the upper and lower thresholds. If comparison circuitry 512 determines that the pose or gesture 500*b* matches pose information of the quotation, comparison circuitry 512 transmits a signal 526 to output circuitry 528 to generate for display a content recommendation comprising an identifier of the content item from which the quotation comes. Output circuitry 528, which may be a GPU, VGA port, HDMI port, or any other suitable graphical output component, then generates for display 530 a search result comprising an identifier of the particular content item.

Figure 6:
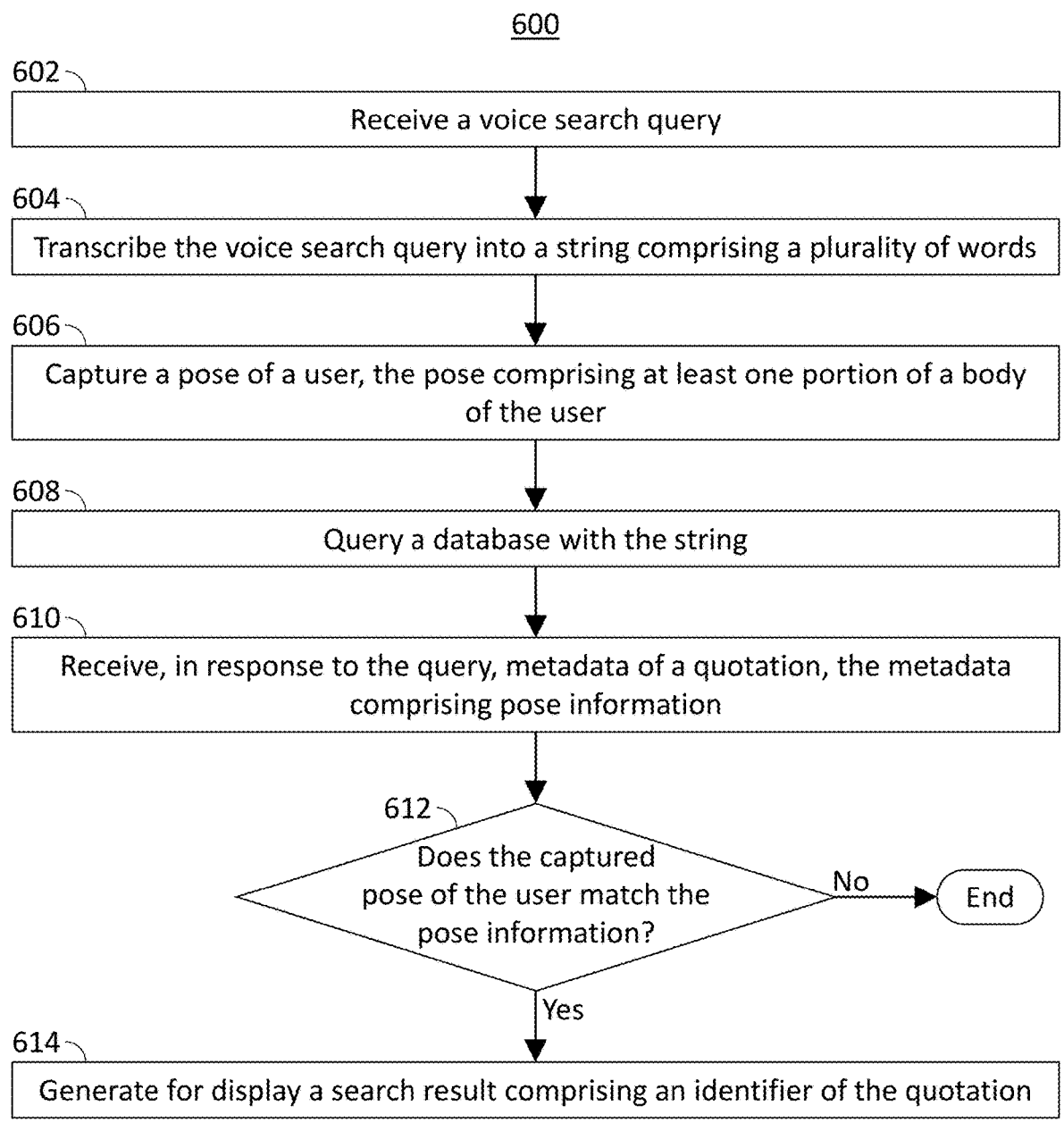
FIG. 6 is a flowchart representing a process for disambiguating a voice search query based on a gesture of the user, in accordance with some embodiments of the disclosure.

FIG. 6 is a flowchart representing an illustrative process 600 for disambiguating a voice search query based on a gesture of the user, in accordance with some embodiments of the disclosure. Process 600 may be implemented on control circuitry 504. In addition, one or more actions of process 600 may be incorporated into or combined with one or more actions of any other process or embodiment described herein.

At 602, control circuitry 504 receives, from input circuitry 502, a voice search query. At 604, control circuitry 504, using transcription circuitry 508, transcribes the voice search query into a string comprising a plurality of words. Transcription circuitry 508 may use any suitable text-to-speech technique to transcribe the voice search query.

At 606, input circuitry 502 captures or otherwise receives image data of a pose of the user. The pose includes at least one portion of the body of the user. This may be accomplished using methods described above in connection with FIG. 5.

At 608, control circuitry 504 queries the quotation database with the string. For example, control circuitry 504 may construct and transmit an SQL "SELECT" command to the content database to retrieve quotation metadata of all quotations matching the string, or significant portions thereof. At 610, control circuitry 504 receives, in response to the query, metadata of a quotation. The metadata includes pose information of the quotation.

At 612, control circuitry 504, using comparison circuitry 512, determines whether the captured pose of the user matches the pose information in the metadata of the quotation. If the captured pose of the user matches the pose information in the metadata of the quotation, then, at 614, control circuitry 504, using output circuitry 528, generates for display a search result comprising an identifier of the content item from which the quotation comes.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
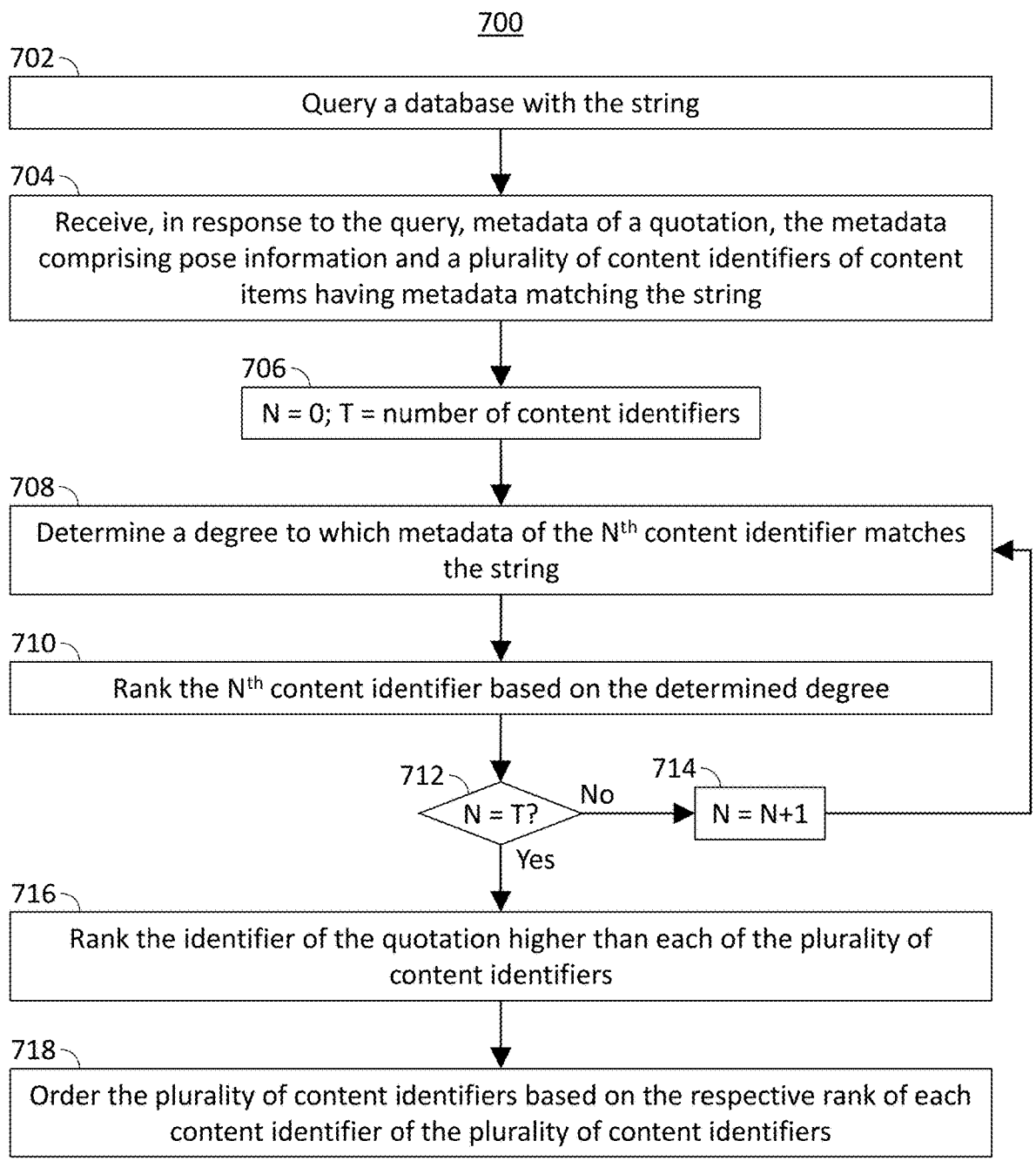
FIG. 7 is a flowchart representing a process for retrieving and displaying search results, in accordance with some embodiments of the disclosure.

FIG. 7 is a flowchart representing an illustrative process 700 for retrieving and displaying search results, in accordance with some embodiments of the disclosure. Process 700 may be implemented on control circuitry 504. In addition, one or more actions of process 700 may be incorporated into or combined with one or more actions of any other process or embodiment described herein.

At 702, control circuitry 504 queries the quotation database with the string as described above in connection with FIG. 6. At 704, control circuitry 504 receives, in response to the query, and in addition to metadata of a quotation as described above in connection with FIG. 6, a plurality of content identifiers of content items having metadata matching the string. For example, the string may be the words "I'm the king of the world," and identifiers of content items having titles containing all or some of the words of the string may be received. At 706, control circuitry 504 initializes a counter variable N and sets its value to zero. Control circuitry 504 also sets the value of a variable T to the total number of content identifiers received. At 708, control circuitry 504 determines a degree to which metadata of the $N^{th}$ content item matches the string. For example, a content item having a title containing only the words "the world" may not match the string as closely as a content item having a title containing the words "king of the world." Control circuitry 504 may calculate a percent similarity between the string and the metadata of the content item. At 710, control circuitry 504 ranks the $N^{th}$ content identifier based on the determined degree of similarity. Then, at 712, control circuitry 504 determines whether there are additional content identifiers to process. If so, then, at 714, control circuitry 504 increments the value of N by one, and processing returns to step 708.

If there are no additional content identifiers to process, then, at 716, control circuitry 504 ranks a content identifier for the content item from which the quotation comes higher than each of the plurality of other content identifiers. Control circuitry 504 then, at 718, orders all the content identifiers based on the respective rank of each content identifier. The content identifiers are displayed as search results in this order.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

FIG. 8 is a flowchart representing an illustrative process 800 for capturing the pose of a user, in accordance with some embodiments of the disclosure. Process 800 may be implemented on control circuitry 504. In addition, one or more actions of process 800 may be incorporated into or combined with one or more actions of any other process or embodiment described herein.

At 802, control circuitry 504 receives image data representing at least a portion of the body of the user. As described above in connection with FIG. 5, the image data may be visual information, infrared, active or passive marker tracking data, or any other suitable imaging data. At 804, control circuitry 504 identifies portions of the body of the user represented in the image data. For example, control circuitry 504 may perform object recognition, facial recognition, edge detection, or any other suitable image processing method to identify the portions of the body of the user represented in visual or infrared data. If the image data comprises marker tracking data, control circuitry 504 may construct a wireframe or line segment drawing representing the user to fit around the tracked points of the user in order to identify the portion of the body of the user represented by each tracked point.

At 806, control circuitry 504 determines a position of each identified portion of the body of the user. For example, control circuitry 504 may superimpose a grid over the image data and determine Cartesian coordinates for each identified portion of the body of the user. Alternatively, control circuitry 504 may use pixel coordinates representing the center of each identified portion of the body of the user.

At 808, control circuitry 504 determines a respective relative position of each identified portion of the body of the user relative to each other identified portion of the body of the user. For example, control circuitry 504 uses the position information determined above at step 806 and calculates the distance and direction between each identified portion of the body of the user. When comparing the pose of the user with the pose information, control circuitry 504 can scale the calculated distances to better match distance information in the pose information.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

FIG. 9 is a flowchart representing a second process 900 for capturing the pose of a user, in accordance with some embodiments of the disclosure. Process 900 may be implemented on control circuitry 504. In addition, one or more actions of process 900 may be incorporated into or combined with one or more actions of any other process or embodiment described herein.

At 902, control circuitry 504 receives position data from at least one user device placed on the body of the user, such as an inertial measurement unit. Alternatively, a mobile device of the user comprising inertial measurement circuitry and/or accelerometric circuitry may be used. At 904, control circuitry 504 identifies a portion of the body of the user on which the at least one user device is located. For example, each device may registered with the system to be associated with a specific portion of the body of the user. When a device reports its position, control circuitry 504 automatically assigns the position to the associated portion of the body of the user. At 906, control circuitry 504 determines a position of the identified portion of the body of the user relative to other portions of the body of the user. This may be accomplished using methods described above in connection with FIG. 8.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
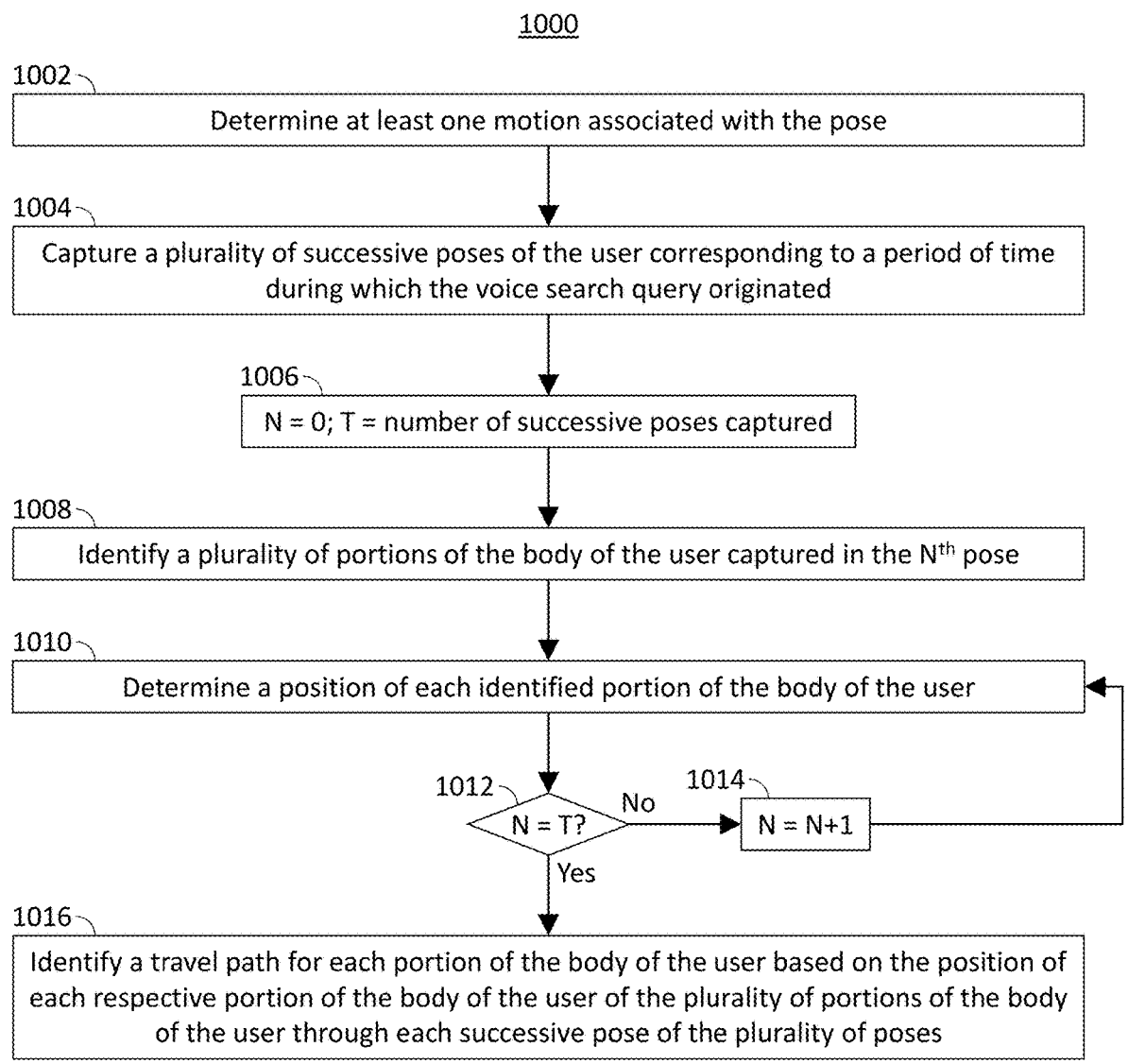
FIG. 10 is a flowchart representing a process for identifying a pose of the user including motion, in accordance with some embodiments of the disclosure.

FIG. 10 is a flowchart representing an illustrative process 1000 for identifying a pose of the user including motion, in accordance with some embodiments of the disclosure. Process 1000 may be implemented on control circuitry 504. In addition, one or more actions of process 1000 may be incorporated into or combined with one or more actions of any other process or embodiment described herein.

At 1002, control circuitry 504 determines at least one motion associated with the pose. Control circuitry 504 may determine that the character speaking the quotation associated with the pose in the content item is moving during the time at which he or she is speaking the quotation. At 1004, control circuitry 504, using input circuitry 502, captures a plurality of successive poses of the user corresponding to the period of time during which the voice query originated. For example, it takes the user three seconds to say the quotation "I'm the king of the world!" Control circuitry 504 captures several successive poses of the user over those three seconds to capture any motion made by the user during that time.

At 1006, control circuitry 504 initializes a counter variable N and sets its value to zero. Control circuitry 504 also sets the value of a variable T to the number of successive poses captured by input circuitry 502. At 1008, control circuitry 504 identifies a plurality of portions of the body of the user captured in the $N^{th}$ pose and, at 1010, determines a position of each identified portion of the body of the user. For example, control circuitry identifies the user's head, left hand, and right hand in the first pose and, using methods described above in connection with FIG. 8, determines the position of each of those portions of the body of the user. Control circuitry 504 then tracks the position of each portion of the body of the user through each successive pose. At 1012, control circuitry 504 determines if there are additional poses to process. If so, then, at 1014, control circuitry 504 increments the value of the counter variable N, and processing returns to step 1010.

If there are no additional poses to process, then, at 1016, control circuitry 504 identifies a travel path for each portion of the body of the user based on the position of each respective portion of the body of the user through each successive pose. The travel path may be a list or array of coordinates at which the particular portion of the body of the user appears in each successive pose. Alternatively, control circuitry 504 may fit a curve to the successive positions of the particular portion of the body of the user. The pose information may contain a particular type or format of motion data. Control circuitry 504 may convert the travel path into a format or type used in the motion data to facilitate a comparison.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for disambiguating a voice search query, the method comprising:
   receiving a voice search query;
   transcribing the voice search query into a string comprising a plurality of words;
   capturing, concurrently with receiving the voice search query, an image of a pose of a user, the image of the pose comprising a plurality of pixels of at least one portion of a body of the user;
   querying a database with the string;
   identifying, from the database in response to the query, a plurality of quotations matching the string;
   retrieving, from the database, metadata of a quotation of the plurality of quotations matching the string, the metadata including quotation pose information corresponding to the matched string
   comparing the quotation pose information included in the received metadata with the captured image of the pose of the user, wherein the comparing comprises:
      scaling a first size of the captured image of the pose of the user to match a second size of the quotation pose;
      superimposing a grid over the captured image of the pose of the user;
      determining, based on the grid, a second set of pixel coordinates describing a location of the at least one portion of the body of the user in the captured image of the pose;
      comparing the second set of pixel coordinates with a first set of pixel coordinates describing a location of at least one portion of a body in the quotation pose information included in the received metadata;
      determining, based on the comparing, whether the captured image of the captured pose of the user matches the quotation pose information; and
   in response to determining that the captured image of the pose of the user matches the quotation pose, generating for display a search result comprising an identifier of the quotation.

2. The method of claim 1, further comprising:
   receiving, in response to the query, a plurality of content identifiers of content items having metadata matching the string; and
   generating for display a plurality of search results comprising the plurality of content identifiers.

3. The method of claim 2, further comprising:
   ranking each content identifier of the plurality of content identifiers based on a degree to which the metadata corresponding to each respective content identifier matches the string;
   ranking the identifier of the quotation higher than each of the plurality of content identifiers; and
   ordering the plurality of content identifiers based on the respective rank of each content identifier of the plurality of content identifiers.

4. The method of claim 1, wherein capturing the image of the pose of the user comprises:
   receiving image data representing at least a portion of the body of the user;
   identifying portions of the body of the user represented in the image data;
   determining a position of each identified portion of the body of the user; and
   determining a respective relative position of each identified portion of the body of the user relative to each other identified portion of the body of the user.

5. The method of claim 1, wherein capturing the image of the pose of the user comprises:
   receiving position data from at least one user device placed on the body of the user;
   identifying a portion of the body of the user on which the at least one user device is located; and
   determining a position of the identified portion of the body of the user relative to other portions of the body of the user.

6. The method of claim 1, further comprising determining at least one motion associated with the image of the pose.

7. The method of claim 6, wherein capturing the image of the pose of the user comprises capturing a plurality of successive images of poses of the user corresponding to a period of time during which the voice search query originated.

8. The method of claim 7, wherein comparing the captured image of the pose of the user with the pose information in the metadata of the quotation comprises:
identifying a plurality of portions of the body of the user captured in a first image of pose of the plurality of successive images of poses; and
identifying a travel path for each portion of the body of the user by tracking a position of each respective portion of the body of the user of the plurality of portions of the body of the user through each successive image of pose of the plurality of images of poses;
wherein the pose information comprises path information.

9. A system for disambiguating a voice search query, the system comprising:
input circuitry configured to:
receive a voice search query; and
capture, concurrently with receiving the voice search query, an image of a pose of a user, the image of the pose comprising a plurality of pixels of at least one portion of a body of the user; and
control circuitry configured to:
transcribe the voice search query into a string comprising a plurality of words;
query a database with the string;
identify, from the database in response to the query, a plurality of quotations matching the string;
retrieve, from the database, metadata of a quotation of the plurality of quotations matching the string, the metadata including quotation pose information corresponding to the matched string;
compare the quotation pose information included in the received metadata with the captured image of the pose of the user, wherein the comparing comprises:
scale a first size of the captured image of the pose of the user to match a second size of the quotation pose;
superimpose a grid over the captured image of the pose of the user;
determine, based on the grid, a second set of pixel coordinates describing a location of the at least one portion of the body of the user in the captured image of the pose;
compare the second set of pixel coordinates with a first set of pixel coordinates describing a location of at least one portion of a body in the quotation pose information included in the received metadata;
determine, based on the comparing, whether the captured image of the pose of the user matches the quotation pose information; and
in response to determining that the captured image of the pose of the user matches the quotation pose, generate for display a search result comprising an identifier of the quotation.

10. The system of claim 9, wherein the control circuitry is further configured to:
receive, in response to the query, a plurality of content identifiers of content items having metadata matching the string; and
generate for display a plurality of search results comprising the plurality of content identifiers.

11. The system of claim 10, wherein the control circuitry is further configured to:
rank each content identifier of the plurality of content identifiers based on a degree to which the metadata corresponding to each respective content identifier matches the string;
rank the identifier of the quotation higher than each of the plurality of content identifiers; and
order the plurality of content identifiers based on the respective rank of each content identifier of the plurality of content identifiers.

12. The system of claim 9, wherein the input circuitry configured to capture the image of the pose of the user is further configured to:
receive image data representing at least a portion of the body of the user;
identify portions of the body of the user represented in the image data;
determine a position of each identified portion of the body of the user; and
determine a respective relative position of each identified portion of the body of the user relative to each other identified portion of the body of the user.

13. The system of claim 9, wherein the input circuitry configured to capture the image of the pose of the user is further configured to:
receive position data from at least one user device placed on the body of the user;
identify a portion of the body of the user on which the at least one user device is located; and
determine a position of the identified portion of the body of the user relative to other portions of the body of the user.

14. The system of claim 9, wherein the control circuitry is further configured to determine at least one motion associated with the image of the pose.

15. The system of claim 14, wherein the input circuitry configured to capture the image of the pose of the user is further configured to capture a plurality of successive images of poses of the user corresponding to a period of time during which the voice search query originated.

16. The system of claim 15, wherein the control circuitry configured to compare the captured image of the pose of the user with the pose information in the metadata of the quotation is further configured to:
identify a plurality of portions of the body of the user captured in a first image of pose of the plurality of successive images of poses; and
identify a travel path for each portion of the body of the user by tracking a position of each respective portion of the body of the user of the plurality of portions of the body of the user through each successive image of the pose of the plurality of images of poses;
wherein the pose information comprises path information.

* * * * *